United States Patent [19]

Smith

[11] Patent Number: 5,515,387
[45] Date of Patent: May 7, 1996

[54] SIGNAL INDEPENDENT PULSE CODE MODULATION DATA ENHANCER AND ASSOCIATED METHOD

[75] Inventor: Kenneth C. Smith, Saratoga, Calif.

[73] Assignee: TRW Inc., Redondo Beach, Calif.

[21] Appl. No.: 354,307

[22] Filed: Dec. 12, 1994

[51] Int. Cl.⁶ .................................................. G06F 11/10
[52] U.S. Cl. ............................................. 371/37.1; 371/30
[58] Field of Search ............................. 371/30, 31, 37.1, 371/37.3, 38.1, 41, 37.4

[56] References Cited

U.S. PATENT DOCUMENTS

| | | | |
|---|---|---|---|
| 4,758,902 | 7/1988 | Okamoto et al. | 371/38.1 |
| 4,794,600 | 12/1988 | Shaw-Yueh | 371/37.9 |
| 4,799,221 | 1/1989 | Fukami et al. | 371/38.1 |
| 4,829,525 | 5/1989 | Sugiyama et al. | 371/38.1 |
| 4,943,964 | 7/1990 | Hatanaka et al. | 371/31 |

Primary Examiner—Roy N. Envall, Jr.
Assistant Examiner—Thomas E. Brown
Attorney, Agent, or Firm—G. Gregory Schivley; Robert W. Keller

[57] ABSTRACT

A pulse code modulation (PCM) data enhancer which corrects bit errors using correlations between two particular PCM words received by a receiving unit separated by a predetermined time interval and a method therefor. A primary and a number of secondary pulse codes are stored in a first-in-first-out (FIFO) memory. The primary pulse code is modified, and the modified and secondary pulse codes provide addresses to a memory storing the probability of a transition between the modified pulse code and each of the secondary pulse codes. The probabilities are then accumulated, and the modified pulse code resulting in the greatest accumulated probability is output as an error-corrected data word.

27 Claims, 2 Drawing Sheets

SIGNAL INDEPENDENT PULSE CODE MODULATION DATA ENHANCER AND ASSOCIATED METHOD

BACKGROUND OF THE INVENTION

1. Field of the Invention

This invention relates generally to a pulse code modulation (PCM) data enhancer for improving transmission accuracy. More particularly, this invention relates to detecting transmission errors occurring when PCM data words are part of an underlying waveform for which correlations can be determined.

2. Discussion

Pulse code modulation (PCM) is a method of transmitting continuously varying signals in which a signal is sampled, the value of each sample is quantized into one of a finite set of permitted values, and the quantized value is then transmitted in patterns of on-or-off digital pulses or bits. These operations are traditionally known as sampling, quantizing, and coding. A typical PCM system transmits a large number of on-or-off pulses per second. In a telephone conversation, for example, 56,000 on-or-off pulses per second may be transmitted to effect PCM communication. In a one-way television communication operation, 70,000,000 on-or-off pulses per second may transmit the television signal. High transmission speeds enable extremely fast communication. Furthermore, a relatively high quality signal is possible even though noise and interference make it difficult to recognize the incoming pulses because only digital logic levels must be detected. However, even high quality signals experience some loss of data while operating in noise and interference conditions. Data loss may also occur when operating in relatively low signal-to-noise ratio situations, as well. When this occurs, recovering lost data is essential to a quality communication system.

Pulse code modulation data has traditionally been relatively sensitive to data loss when bit errors do occur during transmission. In a typical PCM system, even a moderate bit error rate can cause unacceptable noise in the received data signal. In some PCM systems, error correcting codes can detect bit errors, but these systems generally require cooperation between the transmitting and receiver data devices. In other systems, noise reduction occurs by improving the quality of the transmitting and receiving equipment, but such modifications are relatively costly to effect. Moreover, when the sending and receiving equipment cooperate to provide improved PCM signal quality transmission, additional overhead and communication between sending and receiving equipment is required, which further increases the cost of the equipment and decreases the speed of the PCM communication system.

Thus, it is desirable to provide a PCM communication system in which data transmission bit errors are correctable using existing equipment, without significantly increasing the processing or communication overhead required by the sending and receiving communication devices.

SUMMARY OF THE INVENTION

The present invention is directed to an apparatus for correcting potential bit errors in a series of received pulse codes and a method therefor. The apparatus includes a means for storing a primary pulse code and a plurality of secondary pulse codes received by a data receiver. For each of the secondary pulse codes, a transition probability defines the likelihood of transition between the primary pulse code and a particular secondary pulse code. The apparatus further includes means for modifying the primary pulse code and means for accumulating for the modified pulse code the transition probabilities between the modified pulse code and each of the secondary pulse codes, yielding a weight for each modified pulse code. Error correction means corrects errors in the primary pulse code in accordance with the weight, and the weight defines which of the modified pulse codes to substitute for the primary pulse code.

Additional object, advantages, and features of the present invention will become apparent from the following description and appended claims, taken in conjunction with the accompanying drawings.

DETAILED DESCRIPTION OF THE PREFERRED EMBODIMENTS

Figure 1:
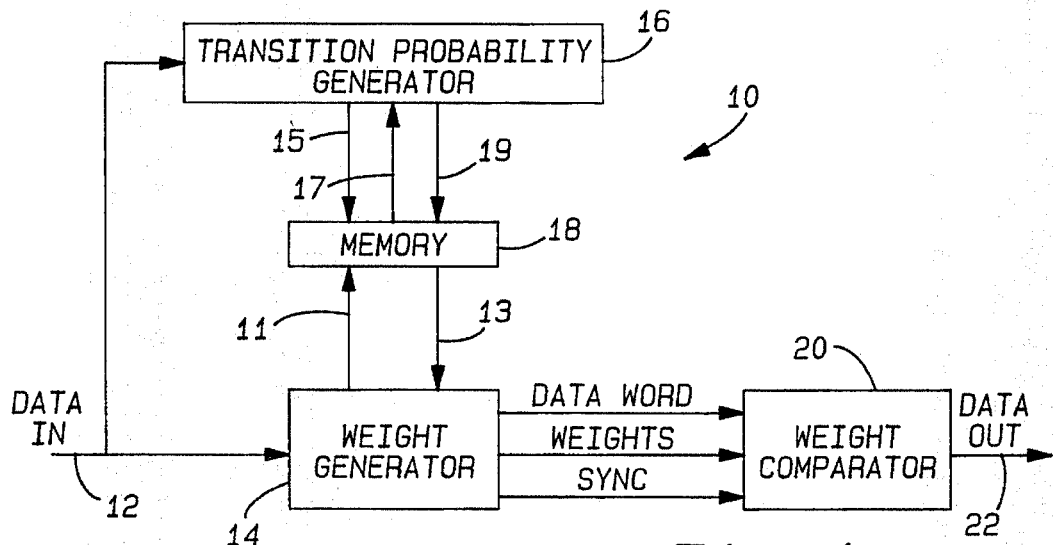
FIG. 1 is a block diagram of the signal-independent PCM data enhancer according to the principles of the present invention.

Referring to FIG. 1, the signal-independent PCM data enhancer is shown and is generally referred to by reference numeral 10. Incoming PCM data is input on line 12 into a weight generator 14 and a transition probability generator 16. Incoming PCM data on line 12 varies in accordance with an underlying waveform and may include bit errors. This apparatus is particularly directed to data correction when the incoming PCM data on line 12 has an underlying waveform having correlations for which statistical transition probabilities may be generated. The statistical transition probabilities define the likelihood of a transition from one PCM word to another PCM word over a predetermined time interval. For example, for a given PCM word a transition probability exists which specifies the likelihood of transition from the given PCM word to a second PCM word over a predetermined time interval. However, the transition probability between the given PCM word and the second PCM word is likely to change over a different, predetermined time interval. Conversely, the transition probability between the given PCM word and a third PCM word over the same predetermined time interval is likely to differ from the transition probability between the given PCM word and the second PCM word. The signal independent PCM data enhancer 10 provides for error correction even on rapidly varying data, provided that the above-mentioned correlations yield transition probabilities defining the likelihood of transition from a first PCM word to a second PCM word over a predetermined time interval. For example, in a voice grade channel transmitting digital data via a modem, the underlying waveform is sinusoidal in shape and lasts for several PCM words. Even though the phase of the sinusoid changes across a bit boundary, it changes to one of a limited set of values. Correlations between a particular PCM word and the PCM words received before and after that particular PCM word provide a basis for generating transition probabilities.

Referring to FIG. 1, weight generator 14 provides on line 11 address information to transition probability memory 18 based on PCM data words received on incoming data line 12. Transition probability memory 18 returns on line 13 transition probabilities in accordance with address information received from weight generator 14 and returns transition probabilities to weight generator 14. Transition probability generator 16 may optionally be used to update the transition probability memory 18 in accordance with incoming PCM data words received on incoming data line 12. Transition probability generator 16 receives current transition probabilities on line 17 in response to address information provided on line 15. Transition probability generator 16 then returns updated transition probabilities on line 19. It should be noted that the transition probability memory 18 need not necessarily be updated continuously, as requirements for a transition probability generator 16 depends on the particular application. The weight generator 14 receives on line 13 transition probabilities from transition probability memory 18 and outputs a PCM data word, a weight corresponding to a summation of transition probabilities, and a synchronization signal, all to be described in greater detail with respect to FIG. 2. Outputs from weight generator 14 are input to weight comparator 20 which determines the PCM data value yielding the greatest weight and outputs that PCM data value on data output line 22.

Figure 2:
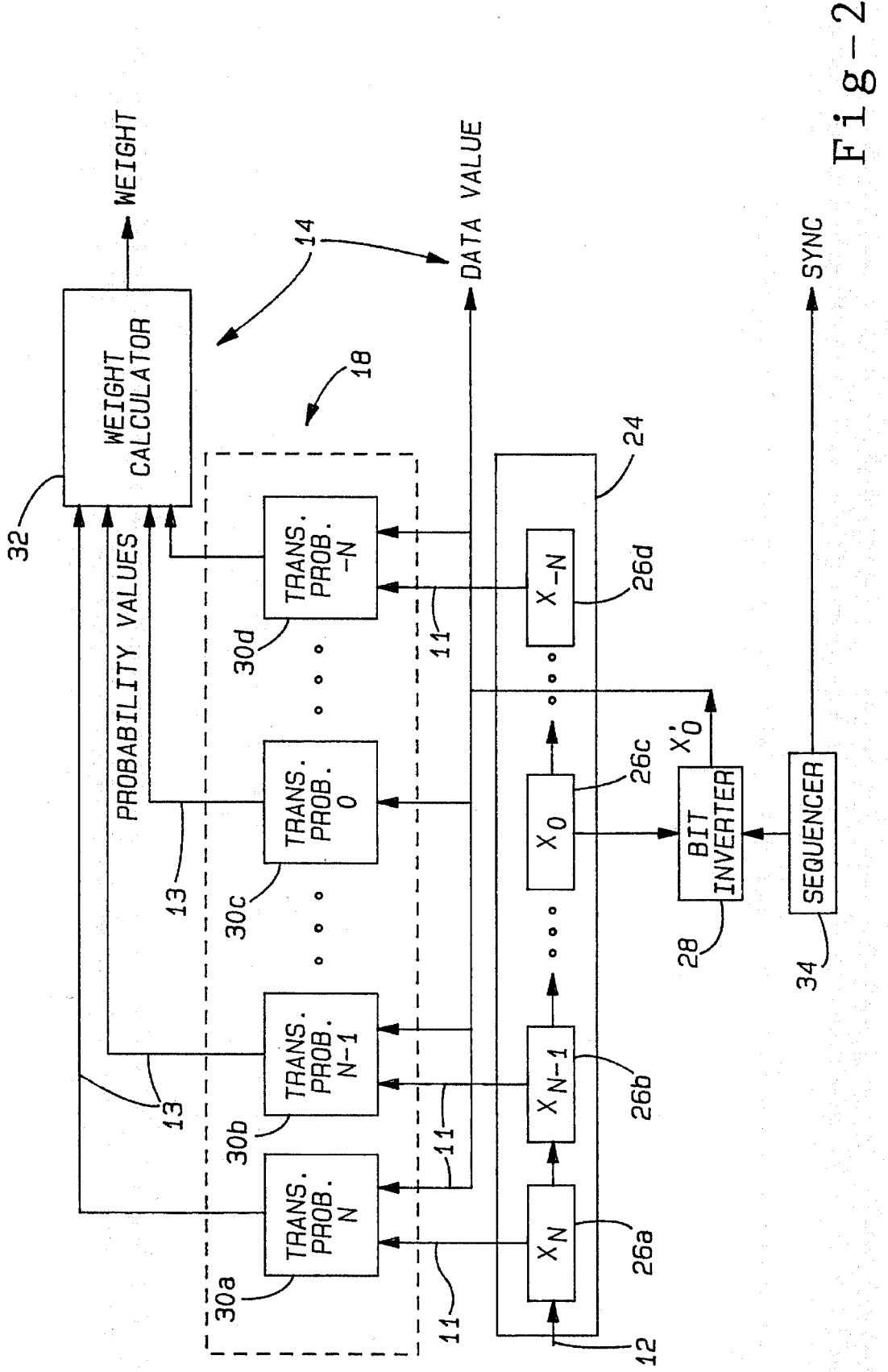
FIG. 2 is an expanded block diagram of the weight generator of FIG. 1 which determines the cumulative transition probability between particular PCM pulse codes.

Referring to FIG. 2, operation of the weight generator 14 will be described. An incoming PCM data received on input line 12 is input into a first-in-first-out (FIFO) memory 24. FIFO memory 24 stores successively received PCM data words so that the first PCM data word received in FIFO memory 24 will also be the first PCM data word output from FIFO memory 24. FIFO memory 24 depicted in FIG. 2 stores a number of PCM data words, the number of which depends upon the particular application requirements and a variety of design considerations. The size of FIFO memory 24 described herein is 2N+1 memory positions 26a–d where N is sufficient for effecting proper error correction and data enhancement. Of the 2N+1 PCM data positions 26a–d, PCM data word $X_0$ stored in data position 26c is the PCM data word for which error correction is effected by the data enhancer 10. That is, the PCM data enhancer 10 provides error correction of PCM data word $X_0$. Data words $X_{-1}$ to $X_{-N}$ are secondary PCM data words stored in FIFO memory 24 in advance of $X_0$. Similarly, PCM data words $X_N$ to $X_1$ are secondary PCM data words stored in FIFO memory 24 after $X_0$. The PCM data enhancer 10 effects data enhancement by advantageously using correlations existing between PCM data word $X_0$ and each secondary PCM data word $X_N$, ..., $X_1$ and $X_{-1}$, ..., $X_{-N}$. Note that because PCM data transmission is highly synchronous, the subscript represents a predetermined time interval between $X_0$ and the other data words. That is, $X_0$ and $X_{N-1}$ were received N–1 units of time apart.

To determine bit errors in PCM data word $X_0$, the individual bits of $X_0$ are sequentially inverted by bit inverter 28 and an output $X'_0$ from bit inverter 28 functions as address information input via line 11 to transition probability memory banks 30a, 30b, 30c, 30d (collectively referred to as reference numeral 30) of transition probability memory 18. A transition probability memory bank 30 exists for each of the 2N+1 PCM data words stored in FIFO memory 24. Each transition probability memory bank 30 is a two dimensional matrix having one address input being the modified PCM data word $X'_0$ and the other address input being the data word $X_N$ to $X_{-N}$, from FIFO memory 24. The contents of the address location in transition probability matrix 30 correspond to the probability of a transition from a particular PCM data word to $X'_0$. For example, transition probability matrix 30b stores transition probabilities defining the likelihood of transition between $X_{N-1}$ to $X'_0$ over a time interval of N–1. Note that for the special case of transition probability matrix 30c, where the transition from $X'_0$ to itself is determined, transition probability matrix 30c is a histogram of input data, and the square root of the value corresponding to $X'_0$ in the histogram is used for weighting. The transition probability matrices 30 output on line 13 the transition probabilities to weight calculator 32, in one embodiment, which sums the transition probabilities output by memory banks 30a–d and outputs a weight which corresponds to the cumulative probability of the modified PCM data word $X'_0$, transitioning to $X_N, X_{N-1}, \ldots X_{-N}$ at times N, N–1, ..., –N, respectively. The transition probability determination and summation operation occurs for an unmodified $X_0$ and for the inversion of each bit of $X_0$. Thus, it will occur nine times if the PCM data words comprise eight bits. However, one skilled in the art would recognize that bit inverter 28 may implement any of a number of bit inversion sequences to generate an $X'_0$.

Alternatively, weight calculator 32 may determine a weight in accordance with the equation $$W = H + \frac{2 \times N \times F}{\sum_{i=-N}^{N} (T_i)} \quad (1)$$

where

H=Number of bits inverted to modify the primary pulse code (the Hanning Distance);

N=Number of secondary pulse codes before (or after) the primary pulse codes;

F=User selectable constant; and $T_i$=Transition probability corresponding to secondary pulse code $X_i$.

Equation one (1) is particularly applicable where bit inverter 28 inverts more than one bit of the primary pulse code $X_o$. The (2×N) term of equation (1) provides a value for normalizing the sum of the transition probabilities. The F term is a user selectable value which allows a tradeoff of error correction against potential signal distortion. Sequencer 34 generates timing pulses which synchronize the sequential inversion of each bits of PCM data word $X_0$ as well as the output latching function of weight comparator 20, to be described further with respect to FIG. 3.

Figure 3:
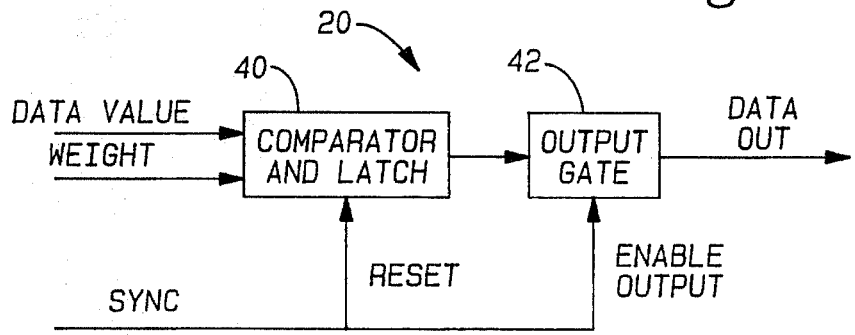
FIG. 3 is an expanded block diagram of the weight comparator of FIG. 1 which determines which modified pulse code yields the greatest cumulative transition probability.

Referring to FIG. 3, an expanded block diagram of weight comparator 20 is shown. The inputs to weight comparator 20, as noted in describing FIG. 1, is a data value $X'_0$ output by bit inverter 28, a weight output by weight calculator 32, and a synchronization signal output by sequencer 34. The synchronization signal is input into comparator and latch 40 and output gate 42, and resets comparator and latch 40 and enables output from output gate 42 when activated. A deactivated synchronization signal output by sequencer 34 delays output from output gate 42 until each of the cumulative transition probabilities for a PCM data word $X_0$ can be determined. Thus, assuming that PCM data word $X_0$ is an 8-bit word, 9 weights must be determined corresponding to an unmodified $X_0$ and inversion of each of the 8 bits of $X_0$. While the synchronization signal disables output from output gate 42, comparator and latch 40 receives a data value $X'_0$ and a weight for each of the nine variations of PCM data word $X_0$. Comparator and latch 40 operates such that whenever an input weight has a higher value than the input weight currently stored in comparator and latch 40, that weight and its associated data value are then latched into weight comparator and latch 40. After weights have been determined for each of the variations for PCM data word $X_0$, sequencer 34 activates a synchronization signal which causes the selected data value to be output from output gate 42 and resets weight comparator and latch 40.

Figure 4:
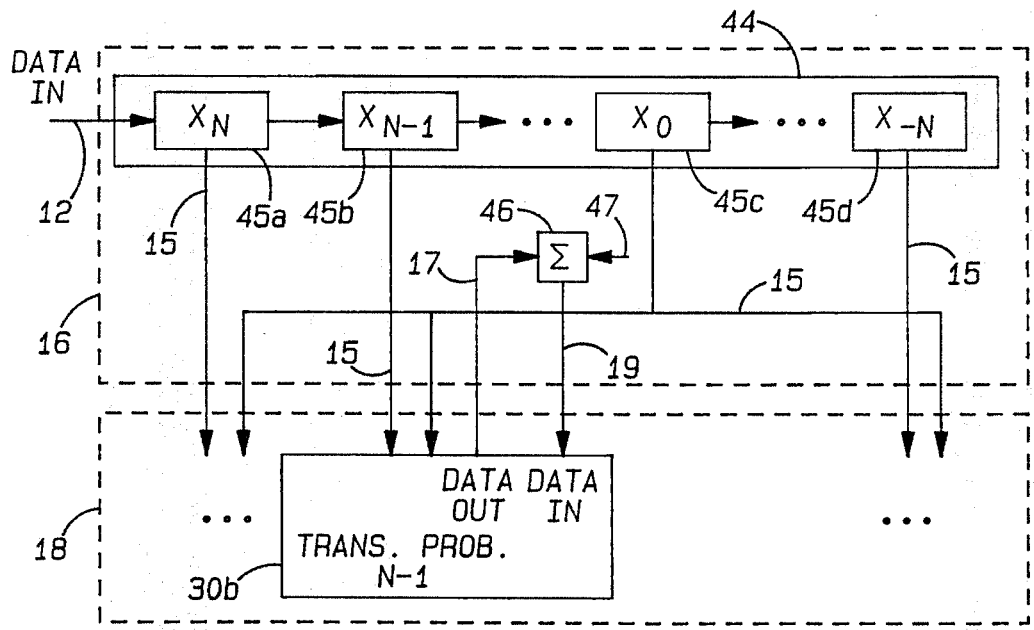
FIG. 4 is an expanded block diagram of the transition probability calculator of FIG. 1 for cumulatively updating the transition probability matrix.

Referring to FIG. 4, an expanded block diagram of the transition probability calculator 16 shown in FIG. 1 is depicted. The transition probability calculator 16 includes a FIFO memory 44 having 2N+1 data positions 45a–d and operates similarly to the FIFO memory 24 described with respect to FIG. 2. For each of the PCM data words $X_N$ to $X_{-N}$ stored in FIFO memory 44, a transition probability memory bank 30a–d of transition probability matrix 18 corresponds. With respect to FIG. 4, the memory bank 30b corresponding the PCM data word $X_{N-1}$ is shown. Note that this memory bank is similarly referenced as in FIG. 2 and is exemplary of the entirely of memory banks 30a–d, of which there are 2N+1 total. Transition probability calculator 16 outputs to transition probability memory 18 on line 15 a pair of addresses corresponding PCM data words $X_0$ and $X_{N-1}$ (in the example of memory bank 30b). The addresses are input to memory bank 30b which outputs a transition probability value on line 17 indicating the likelihood of a transition from $X_0$ to $X_{N-1}$ over N–1 units of time to averager 46. When a particular combination of values occurs at a predetermined time interval, the memory location of memory bank 30b referenced by the addresses is updated. The memory location is incremented by an averaging factor input on line 47 which is much smaller than 1. After each data value is updated, the entire memory bank is then scaled so that an entry updated each cycle maintains a transition probability of 1. This provides an exponential averaging of the weights with the decay factor of the exponential controlled by the averaging factor and the feedback value. These values can then be adjusted for the desired adaptation behavior. One skilled in the art will recognize that any of a number of appropriate approaches to updating transition probability memory 18 may be implemented. For example, in a second embodiment, transition probability generator updates the matrix entries only once, or upon user request, rather than continuously. In the alternative embodiment, when the combination of values occurs, the value one (1) is added to the corresponding matrix entry.

Thus, it can be seen from the above description and drawings, and the following claims, that the signal independent PCM data enhancer 10 provides PCM pulse code bit correction based only on the surrounding values of a particular pulse code word and the time interval separating the particular pulse code word and those values. The data enhancement process is effected without encoding the data using check bytes or encoding schemes and without modifying the sending and receiving devices to directly increase signal-to-noise ratios. Rather, the signal-independent PCM data enhancer 10 operates on the correlative effect of the incoming data signal.

One skilled in the art will readily recognize from such discussion, and from the accompanying drawings and claims, that various changes, modifications and variations can be made therein without departing from the spirit and scope of the invention as defined in the following claims.

What is claimed is:

1. Apparatus for correcting potential bit errors in a series of received pulse codes including a primary pulse code and a plurality of secondary pulse codes, comprising:

means for storing the primary pulse code and a plurality of secondary pulse codes, each of said secondary pulse codes being associated with a transition probability that is the likelihood of transition between said primary pulse code and a particular one of said secondary pulse codes;

means for modifying said primary pulse code to correct a potential error;

means for accumulating for said modified and primary pulse codes the transition probabilities between said modified and primary pulse codes and each of said secondary pulse codes and calculating a weight for each modified and primary pulse code; and means for correcting potential errors in said primary pulse code in accordance with said weights, said weights defining whether to substitute one of said modified pulse codes for said primary pulse code when said primary pulse code was received with error.

2. The apparatus as defined in claim 1 wherein said primary pulse code and each of said secondary pulse codes are separated by a predetermined time interval.

3. The apparatus as defined in claim 1 wherein said primary and secondary pulse codes are defined as N-bit binary numbers.

4. The apparatus as defined in claim 1 wherein said means for modifying said primary pulse code repeatedly modifies said primary pulse code.

5. The apparatus as defined in claim 4 wherein said means for modifying said primary pulse code modifies said primary pulse code by inverting at least one bit of said primary pulse code.

6. The apparatus as defined in claim 5 wherein said means for modifying said primary pulse code sequentially inverts each of said bits of said primary pulse code, and said means for accumulating determines the cumulative probability transition for each of said primary and modified pulse codes.

7. The apparatus as defined in claim 6 wherein said means for accumulating determines the cumulative probability transition for said primary pulse code.

8. The apparatus as defined in claim 5 wherein said means for modifying said primary pulse code then accumulates the cumulative probability transition weights for each of said primary and modified pulse codes.

9. The apparatus as defined in claim 1 further comprising a means for updating said probability transitions in accordance with said primary pulse code occurring at a predetermined time interval from each of said secondary pulse codes.

10. The apparatus as defined in claim 1 wherein said means for storing pulse codes stores M secondary pulse codes occurring before said primary pulse code and M secondary pulse codes occurring after said primary pulse code.

11. The apparatus as defined in claim 10 wherein said means for storing pulse codes queues said primary and secondary pulse codes sequentially, an incoming pulse code being a Mth pulse code in said queue with respect to said primary pulse code, said primary pulse code being a M=0 pulse code in said queue, and the oldest secondary pulse code being a –Mth pulse code in said queue.

12. The apparatus as defined in claim 1 further comprising a data latch for storing said modified pulse code which is substituted for said primary pulse code.

13. The apparatus as defined in claim 1 further comprising a means for storing said transition probabilities between said primary pulse code and said secondary pulse codes for each of a predetermined time interval.

14. The apparatus as defined in claim 1 wherein said means for storing said transition probabilities further comprises a three-dimensional matrix having as a first, a second, and a third index, said first index being associated with said primary pulse code, said second index being associated with secondary pulse code, and said third index being associated with said predetermined time intervals, a particular cell of said matrix storing a transition probability between a particular primary and secondary pulse code over said predetermined time interval.

15. The apparatus as defined in claim 1 further comprising a means for updating said transition probability, said means for updating incrementing the transition probability matrix entries for each set of primary and secondary pulse codes.

16. A method for correcting bit errors in a series of received pulse codes, comprising the steps of:

storing a primary pulse code and a plurality of secondary pulse codes, each of said secondary pulse codes being associated with a transition probability that defines the likelihood of transition between said primary pulse code and a particular one of said secondary pulse codes;

modifying said primary pulse code to correct a potential error;

accumulating for said modified and primary pulse codes the transition probabilities between said modified and primary pulse codes and each of said secondary pulse codes to define a weight for each modified and primary pulse codes, said weights defining whether to substitute one of said modified pulse codes for said primary pulse code when said primary pulse code was received with an error; and correcting potential errors in said primary pulse code in accordance with said weights.

17. The method as defined in claim 16 further comprising the step of receiving said primary pulse code and each of said secondary pulse codes in predetermined time intervals.

18. The method as defined in claim 16 wherein modifying said primary pulse code further comprises the step of modifying said primary pulse code by inverting at least one bit of said primary pulse code.

19. The method as defined in claim 18 wherein said step of modifying said primary pulse code further comprises repeatedly modifying said primary pulse code to yield a plurality of modified pulse codes.

20. The method as defined in claim 19 wherein said step of modifying said primary pulse code further comprises sequentially inverting each of said bits of said primary pulse code, and said method further comprises determining the cumulative probability transition for each of said primary and modified pulse codes.

21. The method as defined in claim 16 further comprising the step of determining the cumulative probability transition for said primary pulse code.

22. The method as defined in claim 16 further comprising the step of updating said probability transitions in accordance with said primary pulse code occurring at a predetermined time interval from each of said secondary pulse codes.

23. The method as defined in claim 16 wherein said step of storing pulse codes further comprises storing M secondary pulse codes occurring before said primary pulse code and M secondary pulse codes occurring after said primary pulse code.

24. The method as defined in claim 23 wherein said step of storing pulse codes further comprises queuing said primary and secondary pulse codes sequentially, an incoming pulse code being a Mth pulse code in said queue with respect to said primary pulse code, said primary pulse code being a M=0 pulse code in said queue, and the oldest secondary pulse code being a –Mth pulse code in said queue.

25. The method as defined in claim 16 further comprising the step of storing said transition probabilities between said primary pulse code and said secondary pulse codes over a predetermined time interval.

26. The method as defined in claim 16 wherein said step of storing said transition probabilities further comprises storing said transition probabilities in a three-dimensional matrix having as a first, a second, and a third index, said first index being associated with said primary pulse code, said second index being associated with secondary pulse code, and said third index being associated with said predetermined time intervals, a particular cell of said matrix storing a transition probability between a particular primary and secondary pulse code over said predetermined time interval.

27. An apparatus for correcting potential errors in a series of received pulse codes, comprising:

a data receiver for receiving a data signal represented by a series of pulse codes, said pulse codes varying in a correlative manner such that a transition probability defines a likelihood of transition between a first and a second pulse code over a predetermined time interval;

means for storing a plurality of transition probabilities between each said first pulse code and each of said second pulse codes for each of a number of said predetermined time intervals;

means for storing a primary pulse code and a plurality of secondary pulse codes received by said data receiver, each of said secondary pulse codes being separated from said primary pulse code by different predetermined time intervals;

means for modifying said primary pulse code and for determining a transition probability between said modified pulse code and each of said plurality of secondary pulse codes;

means for accumulating for each of a plurality of modified pulse codes and said primary pulse code a cumulative transition probability between said modified pulse code and each of said secondary pulse codes, said accumulating means providing information in accordance with one of the modified and primary pulse codes and said cumulative transition probability; and error correction means for modifying said primary pulse code in accordance with said cumulative transition probability such that the modified and primary pulse codes yielding a maximum cumulative transition probability replaces the primary pulse code.

\* \* \* \* \*